United States Patent
Ryu et al.

(10) Patent No.: US 8,681,353 B2
(45) Date of Patent: Mar. 25, 2014

(54) METHOD AND APPARATUS OF PROCESSING WIRELESS PRINTING BASED ON WIRELESS LAN

(75) Inventors: Seok Ryu, Suwon-si (KR); Kwang-chul Lee, Suwon-si (KR); Eun-hee Rhim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2097 days.

(21) Appl. No.: 11/106,656

(22) Filed: Apr. 15, 2005

(65) Prior Publication Data
US 2005/0286075 A1   Dec. 29, 2005

(30) Foreign Application Priority Data

Jun. 25, 2004   (KR) ........................ 10-2004-0048037

(51) Int. Cl.
*G06F 3/12* (2006.01)
(52) U.S. Cl.
USPC ............... 358/1.15; 709/220; 709/223; 710/8
(58) Field of Classification Search
USPC .......... 709/249, 223, 220, 221; 370/338, 331; 358/1.15, 402; 399/8; 713/154; 455/418, 435.1; 710/8, 62
See application file for complete search history.

(56) References Cited

U.S. PATENT DOCUMENTS

| | | | |
|---|---|---|---|
| 7,016,948 B1 * | 3/2006 | Yildiz | 709/221 |
| 7,158,783 B2 * | 1/2007 | Eguchi | 455/418 |
| 7,177,957 B2 * | 2/2007 | Vance | 709/220 |
| 7,218,615 B2 * | 5/2007 | Schwartze | 709/220 |
| 7,337,238 B2 * | 2/2008 | Nishio | 709/249 |
| 7,426,401 B2 * | 9/2008 | Nago | 455/418 |
| 7,500,026 B2 * | 3/2009 | Fukunaga et al. | 710/8 |
| 2003/0091015 A1 * | 5/2003 | Gassho et al. | 370/338 |
| 2003/0115367 A1 * | 6/2003 | Ohara | 709/249 |
| 2003/0137959 A1 * | 7/2003 | Nebiker et al. | 370/338 |
| 2003/0156567 A1 * | 8/2003 | Oak | 370/338 |
| 2003/0231339 A1 * | 12/2003 | Makishima et al. | 358/1.15 |

(Continued)

FOREIGN PATENT DOCUMENTS

| | | |
|---|---|---|
| JP | 2002-259089 A | 9/2002 |
| JP | 2002-264431 A | 9/2002 |

(Continued)

OTHER PUBLICATIONS

Guttman, E. et al., "Automatic discovery of thin servers: SLP, Jini and the SLP-Jini Bridge" Industrial Electronics Society, 1999, IECON '99 Proceedings. The 25$^{TH}$ Annual Conference of the IEEE San Jose, CA, USA, Nov. 29-Dec. 3, 1999, Piscataway, NJ, USA, IEEE, US, vol. 2, Nov. 29, 1999, pp. 722-727, XP010366641.

*Primary Examiner* — Firmin Backer
*Assistant Examiner* — Nicholas Pachol
(74) *Attorney, Agent, or Firm* — Sughrue Mion, PLLC

(57) ABSTRACT

A wireless printing system and method based on IEEE 802.11 are provided. A method of requesting a print job, includes: scanning a printer that functions as an AP in a wireless LAN; obtaining an address of the printer from the scanned result; and requesting a predetermined print job by having the obtained address as a destination. The method enables to locate a printer that functions as an Access Point (AP) while stations associate with a Basic Service Set (BSS) in a wireless Local Area Network (LAN) based on IEEE 802.11.

19 Claims, 11 Drawing Sheets

(56) References Cited

U.S. PATENT DOCUMENTS

| | | | |
|---|---|---|---|
| 2004/0141487 A1* | 7/2004 | Lee | 370/338 |
| 2004/0196506 A1* | 10/2004 | Izumi et al. | 358/402 |
| 2004/0228639 A1* | 11/2004 | Badovinac et al. | 399/8 |
| 2005/0005042 A1* | 1/2005 | Fukunaga et al. | 710/62 |
| 2005/0059396 A1* | 3/2005 | Chuah et al. | 455/435.1 |
| 2005/0060535 A1* | 3/2005 | Bartas | 713/154 |
| 2005/0114490 A1* | 5/2005 | Redlich et al. | 709/223 |
| 2005/0163078 A1* | 7/2005 | Oba et al. | 370/331 |
| 2007/0112980 A1* | 5/2007 | Fukunaga et al. | 710/8 |

FOREIGN PATENT DOCUMENTS

| | | |
|---|---|---|
| JP | 2002-287917 A | 10/2002 |
| JP | 2003-216350 A | 7/2003 |
| KR | 10-2002-0006474 | 1/2002 |
| KR | 2002-0059312 A | 7/2002 |
| KR | 2003-0094729 A | 12/2003 |

\* cited by examiner

| FRAME CONTROL | DURATION | DA | SA | BSSID | SEQUENCE CONTROL | FRAME BODY | FCS |
|---|---|---|---|---|---|---|---|
| OCTETS:2 | 2 | 6 | 6 | 6 | 2 | 0-2312 | 4 |

//

METHOD AND APPARATUS OF PROCESSING WIRELESS PRINTING BASED ON WIRELESS LAN

This application claims priority from Korean Patent Application No. 10-2004-0048037, filed on Jun. 25, 2004 in the Korean Intellectual Property Office, the disclosure of which is incorporated herein in its entirety by reference.

BACKGROUND OF THE INVENTION

1. Field of the Invention

The present invention relates to a wireless printing system and method based on IEEE 802.11, and more particularly, to a printing client and a printing server.

2. Description of the Related Art

Demand for wireless printing has increased. There are various print clients, such as a Personal Computer (PC), a cellular phone, a digital camera, a Personal Digital Assistant (PDA), and the like. In order to allow such terminals to perform wireless printing using a printer at a remote location, related studies are under way.

FIG. 1 illustrates a conventional printing method. Referring to FIG. 1, two conventional printing methods are performed using a printer at a remote location.

First, a user 12 who wishes to use a printer 11 is informed of an Internet Protocol (IP) address of the printer 11 by a network manager 13. The user 12 requests the printer 11 to print a print job using the IP address of the printer 11. This method, in which the network manager 13 needs to inform the user 12 of the IP address, is complicated and fails to obtain the IP address when the network manager 13 is absent.

Second, in a multicast Domain Name System (DNS), a Universal Plug and Play (UPnP) system, etc., a user 16 obtains the IP address of a printer 15 using a Service Discovery Protocol (SDP). In this regard, the terminal of the user 16 corresponds to a SDP client, and the printer 15 corresponds to a SDP server. According to the SDP, the user 16 requests the printer 15 to send the IP address of the printer 15. The printer 15 transmits the IP address thereof to the user 16 in response to the request. Although this method partly solves the problems of the first method, it is still a complicated process which requires the SDP to be separately performed. Since different printer manufacturing companies have different SDP processes, terminals manufactured by different companies are not compatible with each other.

SUMMARY OF THE INVENTION

The present invention provides apparatuses and methods for providing wireless printing services using small-sized and simple software by locating a printer using an exiting process other than a separate process of SDP.

The present invention also provides a computer readable medium having embodied thereon a computer program for executing the methods.

According to an aspect of the present invention, there is provided a method of requesting a print job, comprising: scanning for a printer that functions as an Access Point (AP) in a wireless Local Area Network (LAN); obtaining an address of a printer obtained by the scanning; and requesting a predetermined print job by taking the obtained address as a destination.

According to another aspect of the present invention, there is provided a station comprising: a scanning unit scanning a printer that functions as an AP in a wireless LAN; an address obtaining unit obtaining an address of the printer from the scanned result in the scanning unit; and a print job requesting unit requesting a predetermined print job by having the address obtained in the address obtaining unit as a destination.

According to still another aspect of the present invention, there is provided a method of processing a print job, comprising: recognizing a station that scans a printer that functions as an AP in a wireless LAN; providing the recognized station with an address of the printer; and processing a requested print job by having the provided address as a destination.

According to yet another aspect of the present invention, there is provided a printer, comprising: a scan recognizing unit scanning a printer that functions as an AP in a wireless LAN; an address providing unit providing the station recognized in the scan recognizing unit an address of the printer; and a print job processing unit processing a requested print job by having the address provided in the address providing unit as a destination.

According to a further aspect of the present invention, there is provided a computer readable medium having embodied thereon a computer program for executing the method of requesting a print job.

According to a further aspect of the present invention, there is provided a computer readable medium having embodied thereon a computer program for executing the method of processing a print job.

BRIEF DESCRIPTION OF THE DRAWINGS

The above and other aspects of the present invention will become more apparent by describing in detail a exemplary embodiment thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
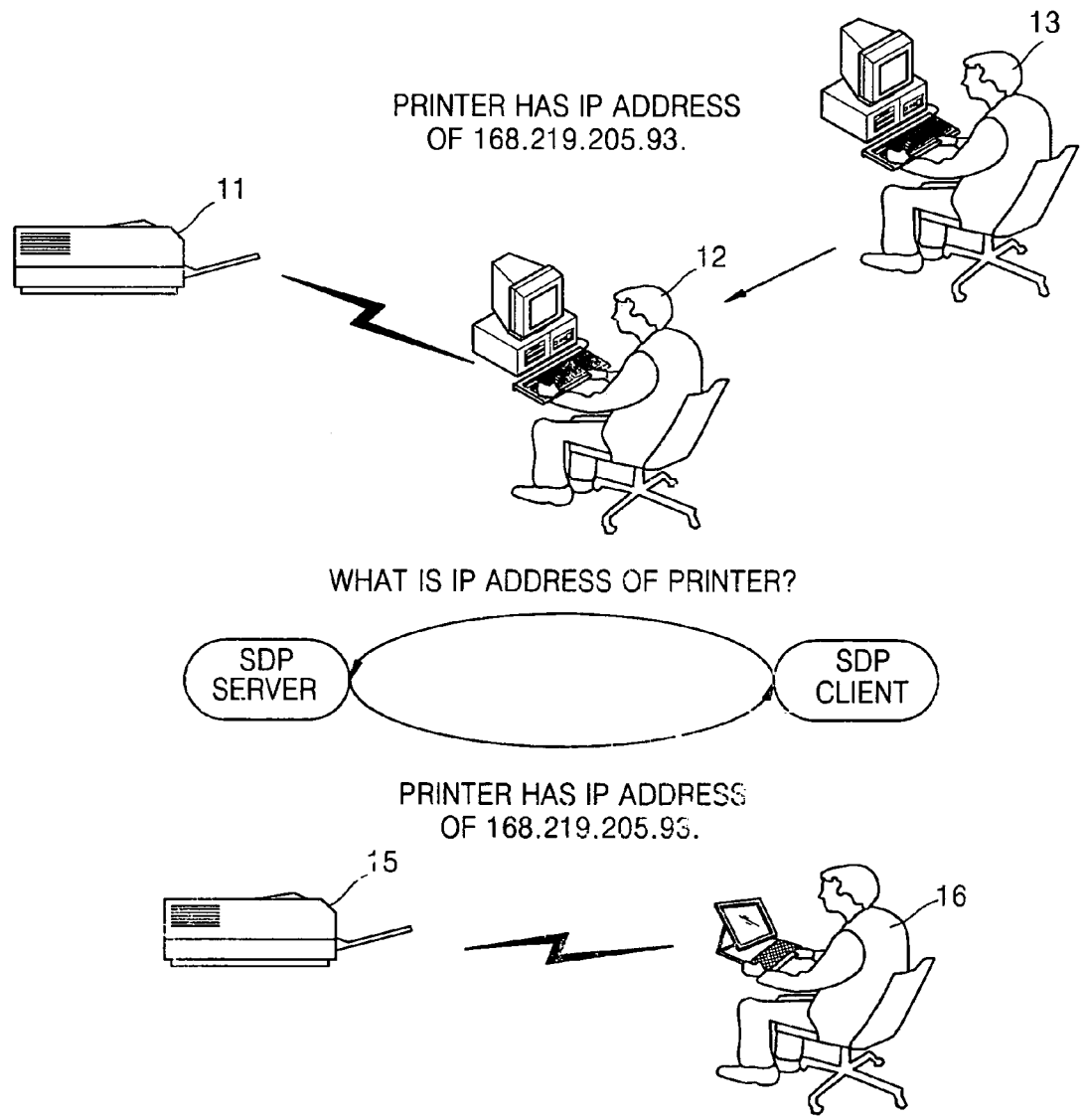
FIG. 1 illustrates a conventional printing method.
Figure 2:
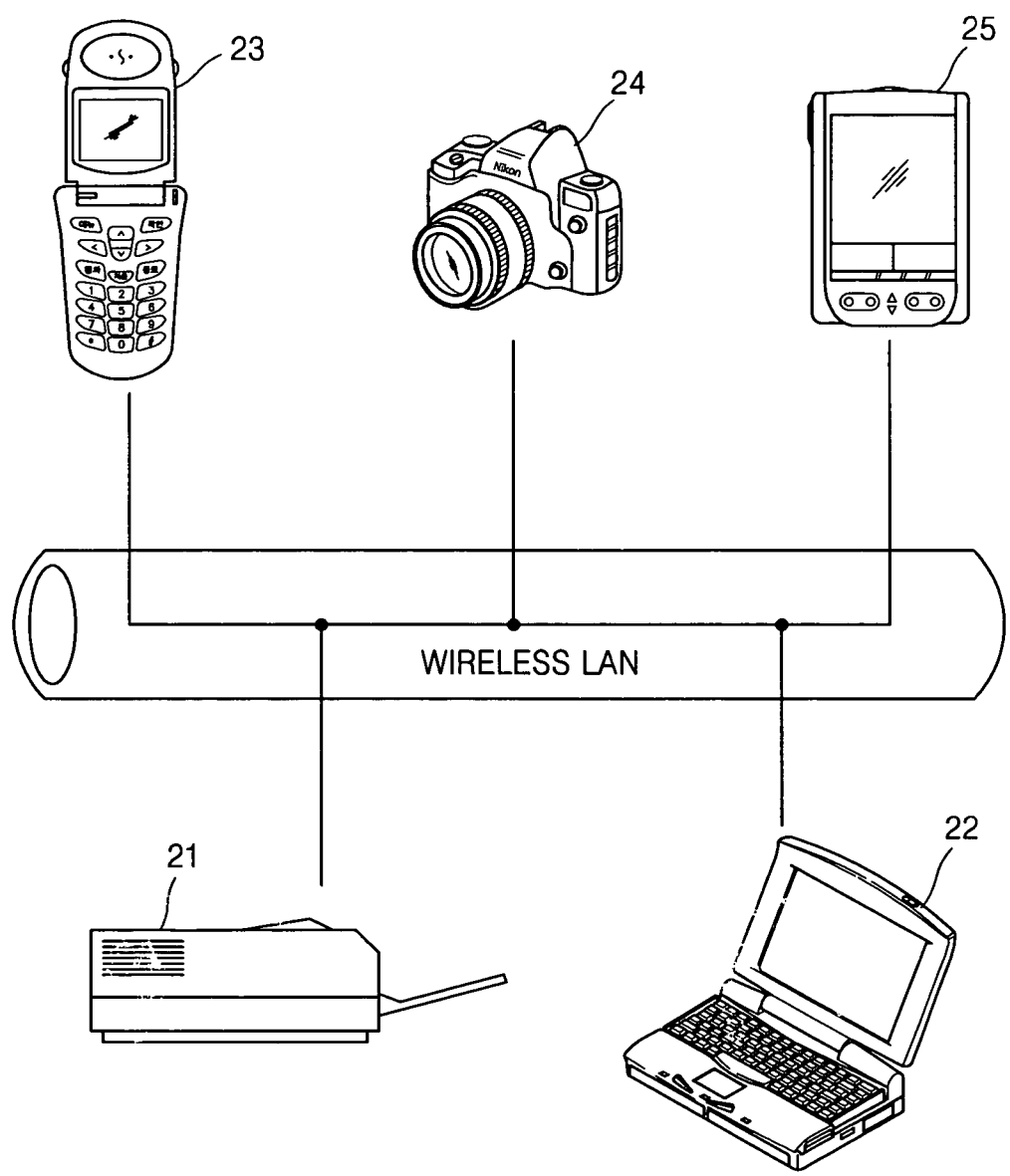
FIG. 2 illustrates a wireless LAN environment to which exemplary embodiments of the present invention are applicable.

FIG. 2 illustrates a wireless LAN environment to which exemplary embodiments of the present invention are applicable. Referring to FIG. 2, the wireless LAN environment applicable to exemplary embodiments described below comprises a printer 21, a notebook computer 22, a cellular phone 23, a digital camera 24, and a PDA 25 which are connected via a wireless LAN.

The wireless LAN environment is based on a wireless LAN operating in an infrastructure mode according to the IEEE 802.11 standard. The wireless LAN operating in an infrastructure mode is referred to as a Basic Service Set (BSS) comprising an AP and stations. In the meantime, a wireless LAN operating in an ad-hoc mode is referred to as a BSS comprising stations only. The BSS is referred to as a group of stations that communicate with each other. The BSS is not referred to as a specific area due to uncertainty regarding the propagation electromagnetic waves. A station in the infrastructure mode communicates with other stations through an AP, whereas, a station in the ad-hoc mode is able to directly communicate with other stations.

It is an object of an exemplary embodiment of the present invention to locate a printer by operating the printer 21 as an AP in the BSS operating in the infrastructure mode while stations 22~25 associate with the BSS. This is to reduce an additional effort to locate a printer using a separate SDP process. As shown in FIG. 2, stations 22~25 refer to a variety of mobile terminals, such as the notebook computer 22, the cellular phone 23, the digital camera 24, and the PDA 25, and the like. These various mobile terminals are used for wireless printing.

Figure 3:
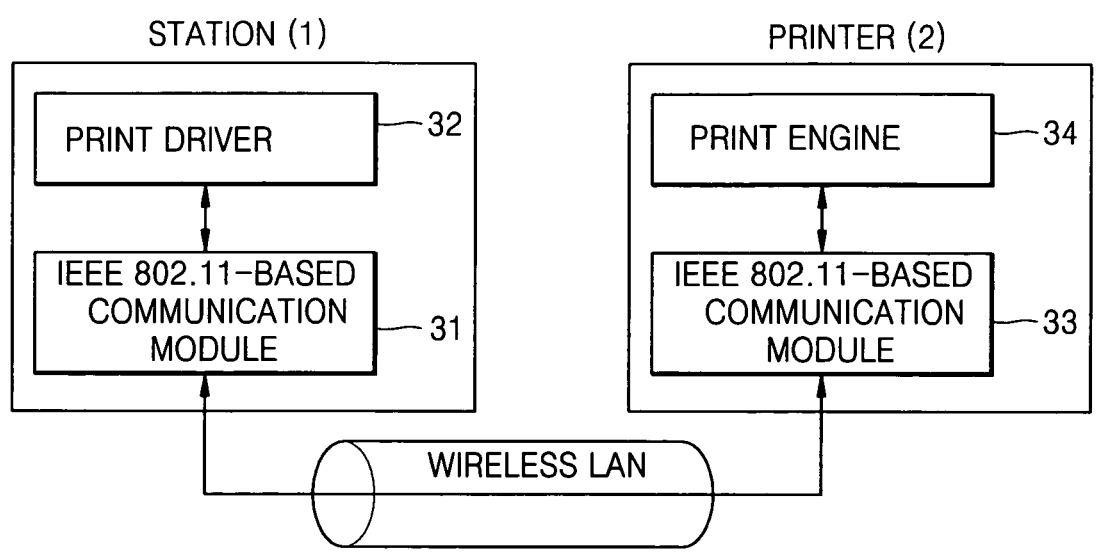
FIG. 3 illustrates the configuration of a wireless printing system according to an exemplary embodiment of the present invention.

FIG. 3 illustrates the configuration of a wireless printing system according to an exemplary embodiment of the present invention. Referring to FIG. 3, a wireless printing system according to an exemplary embodiment of the present invention comprises a station 1 and a printer 2. The wireless printing system is based on a BSS operating in the infrastructure mode, and can include stations other than the station 1.

The station 1 comprises an IEEE 802.11-based communication module 31 and a print driver 32. The IEEE 802.11-based communication module 31 communicates with an AP inside the BSS to which the station 1 belongs and other stations (not shown) according to the IEEE 802.11 standard. However, according to the IEEE 802.11 standard, the IEEE 802.11-based communication module 31 should perform authentication and association processes with respect to the AP inside the BSS to which the station 1 belongs in order to communicate with other stations through the AP.

The print driver 32 is software for controlling a print engine 34 that processes a print job.

The printer 2 comprises an IEEE 802.11-based communication module 33 and the print engine 34.

The IEEE 802.11-based communication module 33 communicates with stations inside a BSS managed by the printer 2 according to the IEEE 802.11 standard. However, according to the IEEE 802.11 standard, the IEEE 802.11-based communication module 33 should perform authentication and association processes with respect to the stations inside the BSS managed by the printer 2 in order to communicate with the stations.

The print engine 34 performs a print job under the control of the print driver 32.

Figures 4, 5:
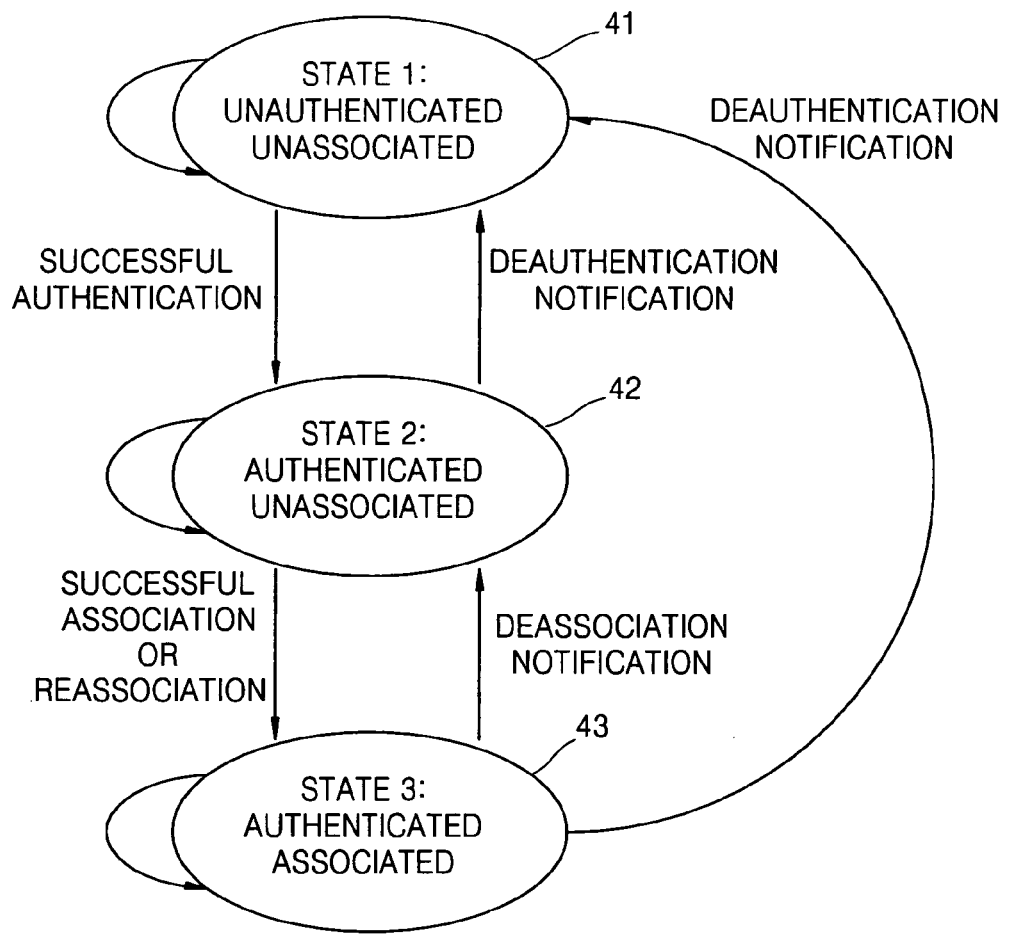
FIG. 4 illustrates states of authentication and association processes according to the IEEE 802.11 standard.
FIG. 5 illustrates the format of a management frame according to the IEEE 802.11 standard.

FIG. 4 illustrates states of authentication and association processes according to the IEEE 802.11 standard. Referring to FIG. 4, the station 1 has three states. A first state 41 is an unauthenticated and unassociated state. A second state 42 is an authenticated and unassociated state. A third state 43 is an authenticated and associated state.

When the station 1 is in the first state 41 it is able to receive and transmit frames only for authentication, for example, a beacon frame transmitted from the AP inside a BSS, or a probe request frame, and a probe response frame for scanning the AP. The probe request frame and the probe response frame should be used to locate the printer 2, since the station 1 is in the first state 1 while the station 1 associates with the BSS. The probe request frame and the probe response frame have the format of a management frame of the IEEE 802.11 standard.

FIG. 5 illustrates the format of a management frame according to the IEEE 802.11 standard. Referring to FIG. 5, the management frame comprises a frame control field, a duration field, a destination address field, a source address field, a frame body field, and a frame check sequence field.

When the station 1 transmits a probe request frame in order to locate the printer 2, the station 1 broadcasts the probe request frame since the address of the printer 2 is unknown. To be more specific, the station 1 transmits a probe request frame in which a destination address field is set to a broadcast address. The address of the printer 2 in the present exemplary embodiment is referred to as the physical address of a network card installed in the printer 2, i.e., a Media Access Control (MAC) address.

The station 1 receives a probe response frame in response to the probe request frame. The source address field of the probe response frame stores the MAC address of the printer 2. Thus, the station 1 can locate the printer 6, since the station 1 knows the MAC address of the printer 2.

Conventional arts have provided wireless printing services using large-sized and complicated software, such as SDP, for a print client and a printer. However, the present exemplary embodiment provides wireless printing services using small-sized and simple software, such as a probe request frame and a probe response frame.

Figure 6:
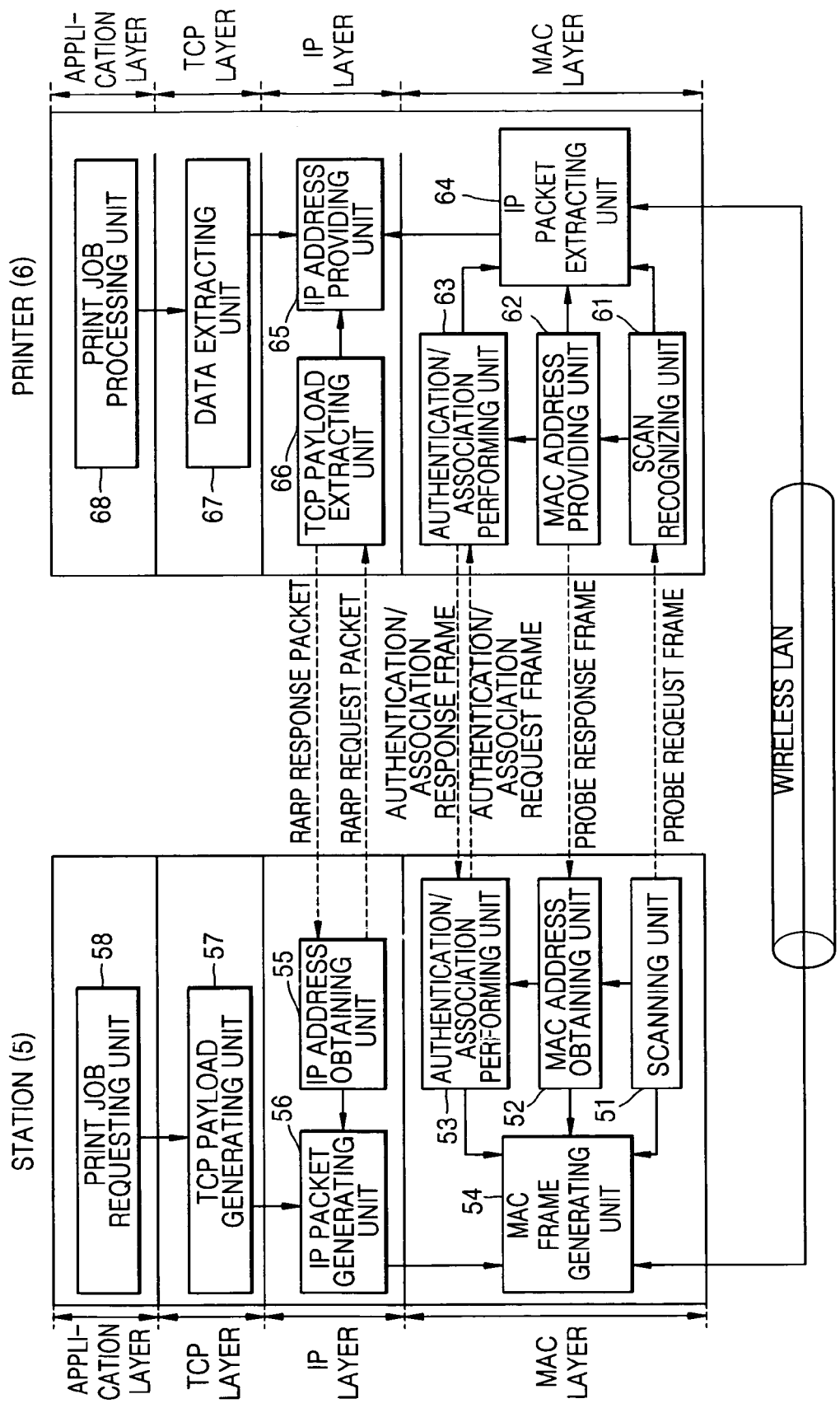
FIG. 6 illustrates the configuration of a first wireless printing system according to an exemplary embodiment of the present invention.

FIG. 6 illustrates the configuration of a first wireless printing system according to an exemplary embodiment of the present invention. Referring to FIG. 6, a first wireless printing system according to an exemplary embodiment of the present invention comprises a station 5 and a printer 6. The present exemplary embodiment, which is an exemplary embodiment of the wireless printing system shown in FIG. 4, is based on a protocol stack comprising a MAC layer, an IP layer, a Transmission Control Protocol (TCP) layer, and an application layer. Although a layer such as a physical layer may be included besides these layers, only the layers relating to the present exemplary embodiment will now be described.

According to a communication structure based on the protocol stack, lower layers of the station 5 and the printer 6 are connected with each other. In order to allow upper layers of the station 5 and the printer 6 to communicate with each other, it should be passed through from upper layer to lower layer, and again from lower layer to upper layer. In this regard, briefly, corresponding upper layers directly communicate with each other. Such communication paths are indicated as dotted lines in FIG. 6. Therefore, it should be understood that frame and packet transmissions/receptions indicated as dotted lines should substantially pass through every layer below the corresponding layer. However, it can be understood by those skilled in the art that other layers or constituents can be added to the layers of the present exemplary embodiment.

The station 5 according to the present exemplary embodiment comprises a scanning unit 51, a MAC address obtaining unit 52, an authentication/association performing unit 53, a MAC frame generating unit 54, an IP address obtaining unit 55, an IP packet generating unit 56, a TCP payload generating unit 57, and a print job requesting unit 58. The scanning unit 51, the MAC address obtaining unit 52, the authentication/association performing unit 53, and the MAC frame generating unit 54 belong to the MAC layer; the IP address obtaining unit 55 and the IP packet generating unit 56 belong to the IP layer; the TCP payload generating unit 57 belongs to the TCP layer; and the print job requesting unit 58 belongs to the application layer.

The scanning unit 51 broadcasts a probe request frame in the IEEE 802.11 standard to scan a printer that functions as an access point in a wireless LAN based on the IEEE 802.11 standard. To be more specific, the scanning unit 51 stores a broadcast address in the destination address field of the probe request frame and transmits the probe request frame.

The MAC address obtaining unit 52 receives a probe response frame in the IEEE 802.11 standard and obtains the MAC address of the printer 6 from the probe response frame transmitted in response to the scanning of the scanning unit 51. To be more specific, the MAC address obtaining unit 52 reads the MAC address stored in the source address field of the probe response frame.

The authentication/association performing unit 53 performs authentication and association with the printer 6 using the address obtained in the MAC address obtaining unit 52. To be more specific, the authentication/association performing unit 53 exchanges an authentication frame with the printer 6, transmits an association request frame to the printer 6, and receives an association response frame from the printer 6.

The MAC frame generating unit 54 generates a MAC frame having a format satisfying the corresponding standard of the MAC layer. To be more specific, the MAC frame generating unit 54 completes frames, and data transmitted from upper layers as MAC frames according to the corresponding standard of the MAC layer in order to transmit the frames and data in the scanning unit 51, the MAC address obtaining unit 52, and the authentication/association performing unit 53. The MAC frames generated in the MAC frame generating unit 54 are transmitted to the MAC layer of the printer 6. The MAC frame generating unit 54 of the present exemplary embodiment includes the IP packet generated in the IP packet generating unit 56, and generates frames transmitted based on the MAC address obtained in the MAC address obtaining unit 52.

When the authentication/association performing unit 53 completes authentication and association, the IP address obtaining unit 55 obtains an IP address corresponding to the address obtained by the MAC address obtaining unit 52 according to a Reverse Address Resolution Protocol (RARP). The RARP, which is a protocol used to determine an IP address from a MAC address, is specified in a Request for Comments (RFC) 903. The printer 6 of the present exemplary embodiment functions as an AP and thus comprises an ARP cash. To be more specific, the IP address obtaining unit 55 transmits an RARP request packet to the printer 6, and receives an RARP response packet in which the IP address of the printer 6 is stored in response to the transmission of the RARP request packet.

The IP packet generating unit 56 generates an IP packet having a format satisfying the corresponding standard of the IP layer. To be more specific, the IP packet generating unit 56 completes packets, and data transmitted from upper layers as IP packets according to the corresponding standard of the IP layer in order to transmit the packets and data in the IP address obtaining unit 55. The IP packets generated in the IP packet generating unit 56 are transmitted to the MAC frame generating unit 54 of the MAC layer. The IP packet generating unit 56 of the present exemplary embodiment generates packets which include a TCP payload generated in the TCP payload generating unit 57, and are transmitted based on the IP address obtained in the IP address obtaining unit 55.

The TCP payload generating unit 57 generates a TCP payload having a format satisfying the corresponding standard of the TCP layer. To be more specific, the TCP payload generating unit 57 completes data transmitted from upper layers as TCP payloads according to the corresponding standard of the TCP layer. The TCP payloads generated in the TCP payload generating unit 57 are transmitted to the IP packet generating unit 56 of the IP layer. The TCP payload generating unit 57 of the present exemplary embodiment generates TCP payloads that include data generated in the print job requesting unit 58, and are recognized by a TCP port allotted for a print job.

The print job requesting unit 58 generates data regarding a print job and requests the print job by taking the MAC address obtained in the MAC address obtaining unit 52 and the IP address obtained in the IP address obtaining unit 56 as destinations. To be more specific, the print job requesting unit 58 generates data contained in TCP payloads to request a print job. Since the present exemplary embodiment transmits data regarding the print job based on an IP address in addition to a MAC address, data can be more effectively transmitted using routing services.

The printer 6 comprises a scan recognizing unit 61, a MAC address providing unit 62, an authentication/association performing unit 63, an IP packet extracting unit 64, an IP address providing unit 65, a TCP payload extracting unit 66, a data extracting unit 67, and a print job processing unit 68. The scan recognizing unit 61, the MAC address providing unit 62, the authentication/association performing unit 63, and the IP packet extracting unit 64 belong to the MAC layer, the IP address providing unit 65 and the TCP payload extracting unit 66 belong to the IP layer, the data extracting unit 67 belongs to a TCP layer, and the print job processing unit 68 belongs to the application layer.

The scan recognizing unit 61 receives a probe request frame in the IEEE 802.11 standard to recognize a station scanning for the printer that functions as an access point in a wireless LAN based on the IEEE 802.11. To be more specific, the scan recognizing unit 61 receives the probe request frame in which a broadcast address is stored in a destination address field.

The MAC address providing unit 62 transmits a probe response frame in the IEEE 802.11 standard to provide the station 5 recognized by the scan recognizing unit 61 with the MAC address of the printer 6. To be more specific, the MAC address providing unit 62 stores the MAC address of the printer 6 in the source address field of the probe response frame and transmits the frame response frame.

The authentication/association performing unit 63 performs authentication and association with the station 5 using the MAC address provided in the MAC address providing unit 62. To be more specific, the authentication/association performing unit 63 exchanges an authentication frame with the station 5, receives an association request frame from the station 5, and transmits an association response frame to the station 5.

The IP packet extracting unit 64 extracts an IP packet from a MAC frame transmitted based on the MAC address provided in the MAC address providing unit 62. The IP packet extracting unit 64 extracts an IP packet from the MAC frame based on results processed in the scan recognizing unit 61, the MAC address providing unit 62, and the authentication/association performing unit 63.

When the authentication/association performing unit 63 completes authentication and association, the IP address providing unit 65 provides the station 5 with an IP address corresponding to the address provided in the MAC address providing unit 62 according to the RARP. To be more specific, the IP address providing unit 65 receives an RARP request packet from the station 5, and transmits to the station 5 an RARP response packet in which the IP address of the printer 6 is stored, in response to the reception of the RARP request packet.

The TCP payload extracting unit 66 extracts a TCP payload from an IP packet transmitted based on the IP address provided in the IP address providing unit 65. To be more specific, the TCP payload extracting unit 66 extracts a TCP payload from the IP packet extracted by the IP packet extracting unit 64.

The data extracting unit 67 extracts data regarding a print job from the TCP payload recognized by a TCP port allotted for the print job. To be more specific, the data extracting unit 67 extracts data regarding the print job from the TCP payload extracted by the TCP payload extracting unit 66.

The print job processing unit 68 processes a requested print job by taking the MAC address provided in the MAC address providing unit 62 and the IP address provided in the IP address providing unit 65 as destinations. To be more specific, the print job processing unit 68 processes a print job regarding data extracted by the data extracting unit 67.

Figure 7:
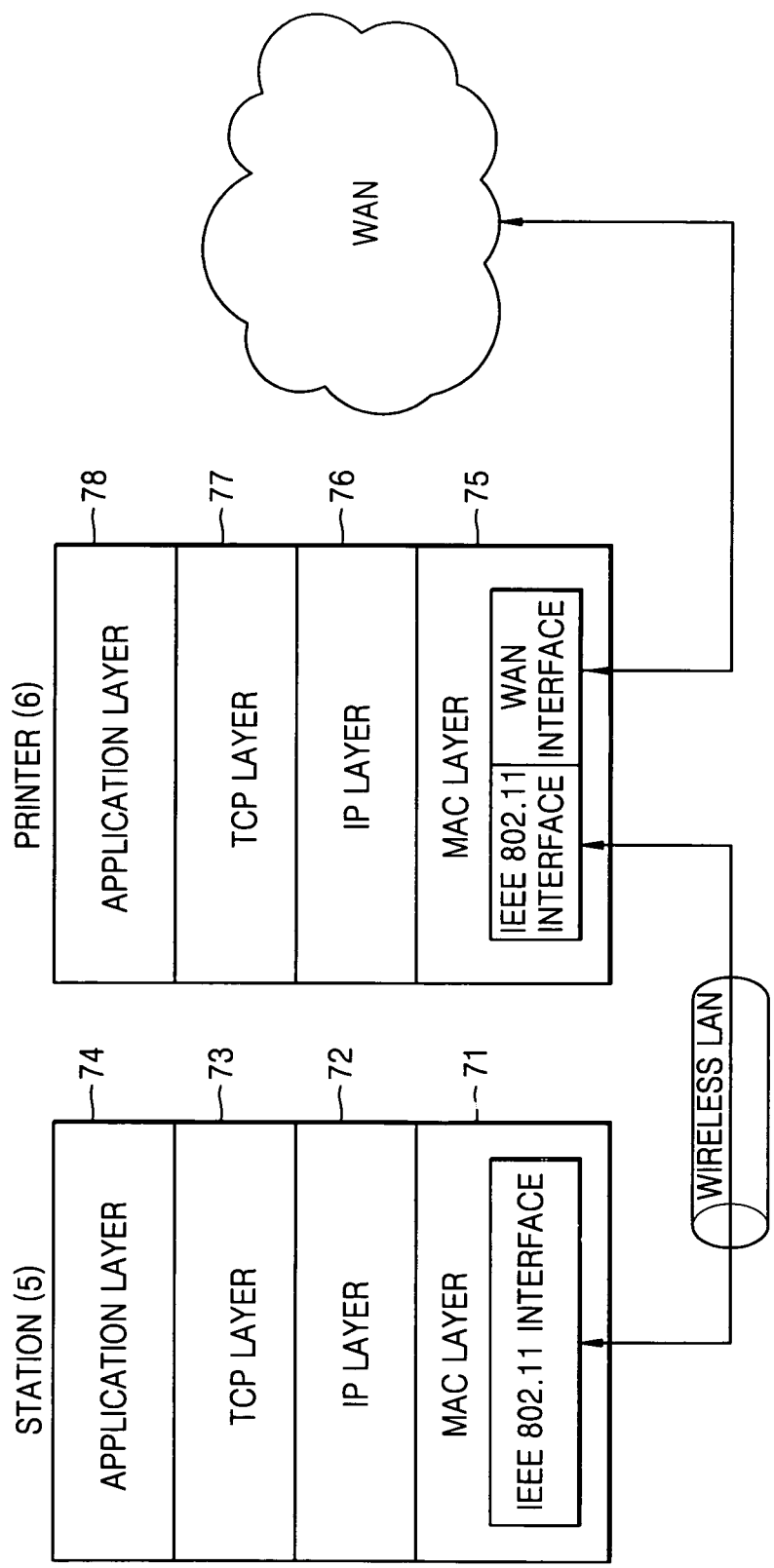
FIG. 7 illustrates an example of the first wireless printing system in FIG. 6.

FIG. 7 illustrates an example of a first wireless printing system in FIG. 6. Referring to FIG. 7, based on the first wireless printing system shown in FIG. 6, the protocol stack of the station 5 comprises a MAC layer 71, an IP layer 72, a TCP layer 73, and an application layer 74, and the protocol stack of the printer 6 comprises a MAC layer 75, an IP layer 76, a TCP layer 77, and an application layer 78.

A Wide Area Network (WAN) interface is installed in the MAC layer 75 of the printer 6 that functions as an access point in a wireless LAN based on the IEEE 802.11. Since the protocol stack of the printer 6 supports a TCP/IP, the printer 6 is able to communicate with stations through the IEEE 802.11 interface regardless of the kind of communication lines, such as a wireless LAN, a WAN, etc., and communicate with terminals that exist in a WAN based on an IP routing algorithm through the WAN interface. In this case, the printer 6 supports both of a wireless printing and a wired printing.

Figure 8:
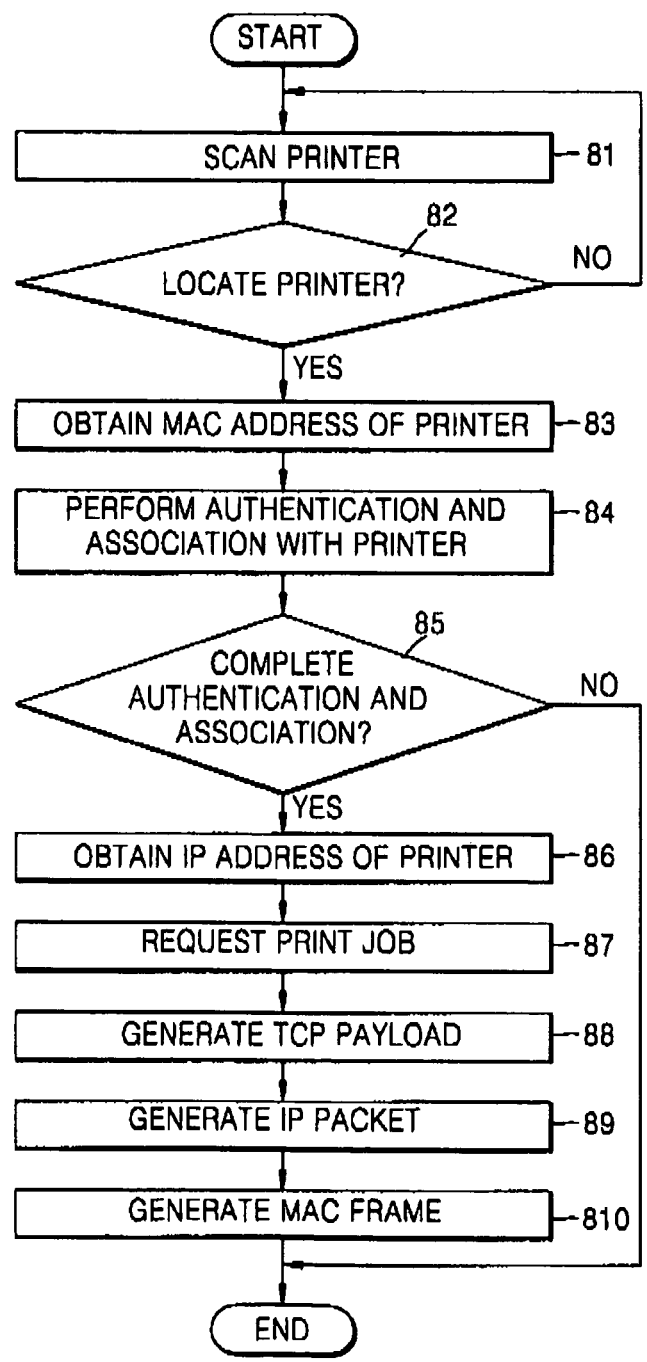
FIG. 8 is a flowchart describing a method of requesting a first print job according to an exemplary embodiment of the present invention.

FIG. 8 is a flowchart describing a method of requesting a first print job according to an exemplary embodiment of the present invention. Referring to FIG. 8, the method of requesting a first print job comprises the operations below. The method of requesting a first print job comprises time series operations processed in the station 5 shown in FIG. 6. The content described regarding the station 5 shown in FIG. 6 is also applied to a method of requesting a first print job.

The station 5 broadcasts a probe request frame according to the IEEE 802.11 standard to scan a printer 6 that functions as an access point in a wireless LAN based on the IEEE 802.11 (Operation 81).

The station 5 determines if the printer 6 is located based on the result obtained by the scanning of Operation 81 (Operation 82).

If the station 5 determines it has located the printer 6 in Operation 82, the station 5 receives a probe response frame in the IEEE 802.11 standard to obtain the MAC address of the printer 6 from the result obtained by the scanning of Operation 81 (Operation 83).

The station 5 performs authentication and association with the printer 6 using the address obtained in Operation 82 (Operation 84).

The station 5 determines if authentication and association is completed based on the result performed in Operation 84 (Operation 85).

If the station 5 determines it has completed authentication and association in Operation 85, the station 5 obtains an IP address corresponding to the address obtained in Operation 83 according to RARP (Operation 86).

The station 5 generates data regarding a print job to request the print job by taking the MAC address obtained in the MAC address obtaining unit 52 and the IP address obtained in the IP address obtaining unit 56 as destinations (Operation 87). To be more specific, the station 5 generates data contained in TCP payloads to request the print job (Operation 87).

The station 5 generates a TCP payload having a format satisfying the corresponding standard of a TCP layer (Operation 88). The station 5 of the present exemplary embodiment generates a TCP payload that contains data generated in Operation 87 and is recognized by a TCP port allotted for a print job.

The station 5 generates an IP packet having a format satisfying the corresponding standard of an IP layer (Operation 89). The station 5 of the present exemplary embodiment generates a packet that includes the TCP payload generated in Operation 88 and is transmitted based on the IP address obtained in Operation 85.

The station 5 generates a MAC frame having a format satisfying the corresponding standard of a MAC layer (Operation 810). The station 5 of the present exemplary embodiment generates a frame that includes the IP packet generated in Operation 89, and is transmitted based on the MAC address obtained in Operation 83.

Figure 9:
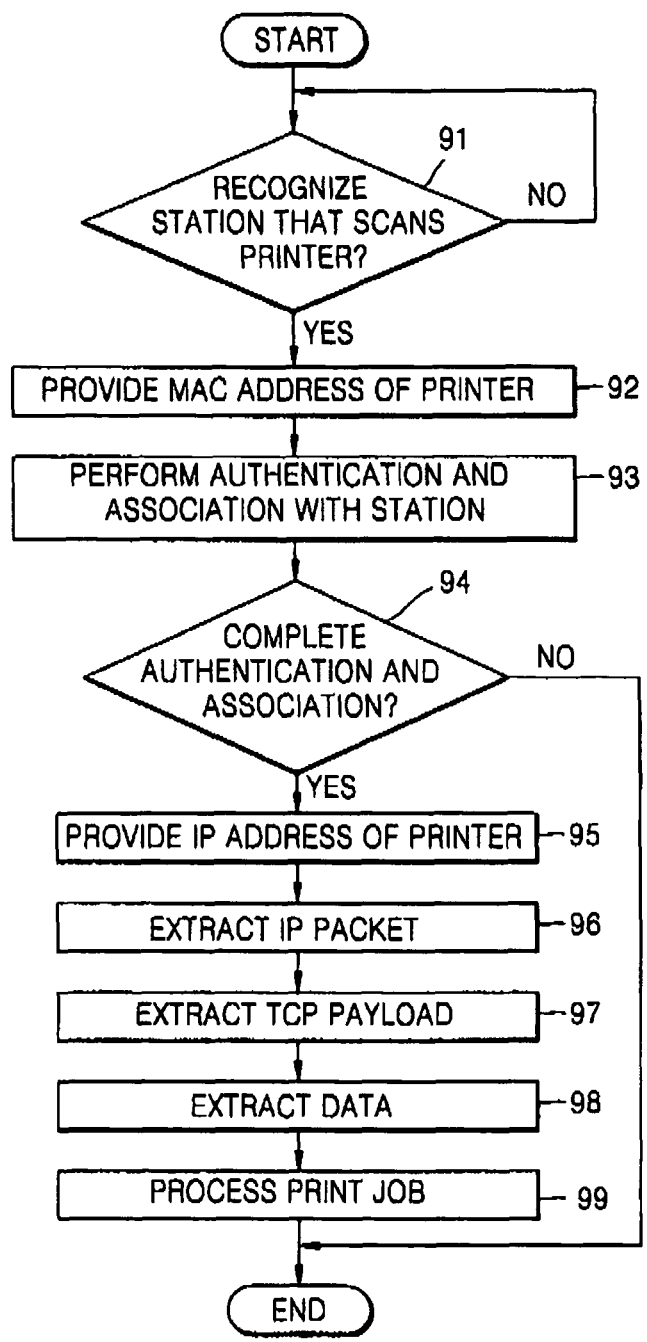
FIG. 9 is a flowchart describing a method of processing a first print job according to an embodiment of the present invention.

FIG. 9 is a flowchart describing a method of processing a first print job according to an exemplary embodiment of the present invention. Referring to FIG. 9, the method of processing a first print job comprises the operations below. The method of processing a first print job comprises time series operations processed in the printer 6 shown in FIG. 6. The content described regarding the printer 6 shown in FIG. 6 is also applied to a method of processing a first print job.

The printer 6 receives a probe request frame in the IEEE 802.11 standard to recognize the station 5 that scans for the printer 6 that functions as an access point in a wireless LAN based on the IEEE 802.11 (Operation 91).

If the printer 6 recognizes the station 5 in Operation 91, the printer 6 transmits a probe response frame in the IEEE 802.11 standard to provide the station 5 recognized in Operation 91 with the MAC address of the printer 6 (Operation 92).

The printer 6 performs authentication and association with the station 5 using the MAC address provided in Operation 92 (Operation 93).

The printer 6 determines if authentication and association that are performed in Operation 93 are completed (Operation 94).

If the printer 6 determines it has completed authentication and association in Operation 94, the printer 6 provides the station 5 with an IP address corresponding to the address provided in Operation 92 according to RARP (Operation 95).

The printer 6 extracts an IP packet from the MAC frame transmitted based on the MAC address provided in Operation 92 (Operation 96).

The printer 6 extracts a TCP payload from the IP packet transmitted based on the IP address provided in Operation 95

(Operation 97). To be more specific, the printer 6 extracts a TCP payload from the IP packet extracted in Operation 96 (Operation 97).

The printer 6 extracts data regarding a print job from the TCP payload recognized by a TCP port allotted for the print job (Operation 98). To be more specific, the printer 6 extracts data regarding the print job from the TCP payload extracted in Operation 97 (Operation 98).

The printer 6 processes a requested print job by taking the MAC address provided in Operation 92 and the IP address provided in Operation 95 as destinations (Operation 99). To be more specific, the printer 6 processes a print job regarding data extracted in Operation 98 (Operation 99).

Figure 10:
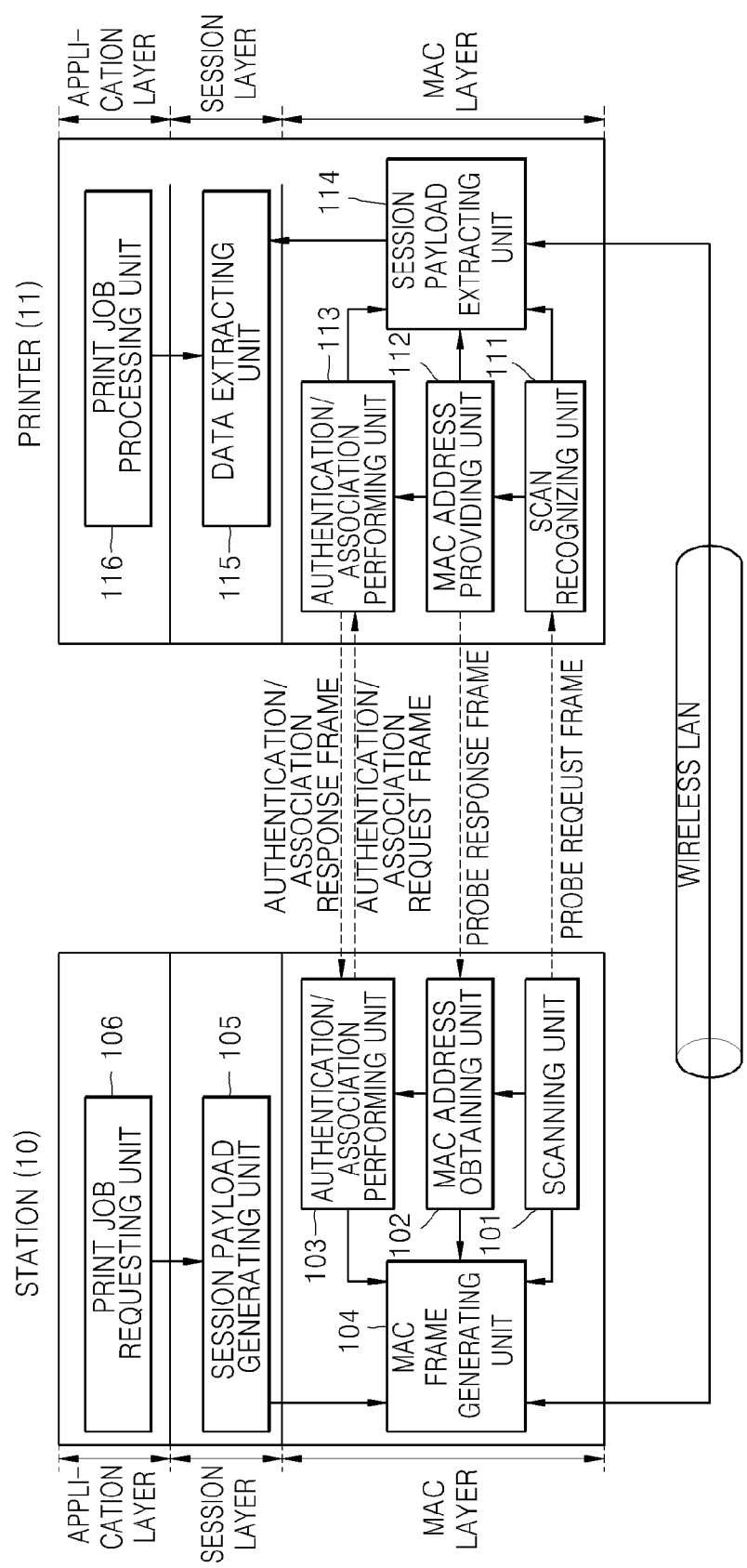
FIG. 10 illustrates the configuration of a second wireless printing system according to an exemplary embodiment of the present invention.

FIG. 10 illustrates the configuration of a second wireless printing system according to an exemplary embodiment of the present invention. Referring to FIG. 10, a second wireless printing system according to an exemplary embodiment of the present invention comprises a station 10 and a printer 11. The present exemplary embodiment, which is an exemplary embodiment of the wireless printing system shown in FIG. 4, is based on a protocol stack comprising a MAC layer, a session layer, and an application layer. Although a layer such as a physical layer may be included besides these layers, only the layers relating to the present exemplary embodiment will now be described.

According to a communication structure based on the protocol stack, lower layers of the station 10 and the printer 11 are connected with each other. In order to allow upper layers of the station 10 and the printer 11 to communicate with each other, it should be passed through from upper layer to lower layer, and again from lower layer to upper layer. However, briefly, corresponding upper layers directly communicate with each other. Such communication paths are indicated as dotted lines in FIG. 10. Therefore, it should be understood that frame and packet transmissions/receptions indicated as dotted lines should substantially pass through every layer below the corresponding layer. However, it can be understood by those skilled in the art that other layers or constituents can be added to the layer of the present exemplary embodiment.

The station 10 according to the present exemplary embodiment comprises a scanning unit 101, a MAC address obtaining unit 102, an authentication/association performing unit 103, a MAC frame generating unit 104, a session payload generating unit 105, and a print job requesting unit 106. The scanning unit 101, the MAC address obtaining unit 102, the authentication/association performing unit 103, and the MAC frame generating unit 104 belong to the MAC layer; the session payload generating unit 105 belongs to the session layer; and the print job requesting unit 106 belongs to the application layer.

The scanning unit 101 broadcasts a probe request frame in the IEEE 802.11 standard to scan a printer that functions as an access point in a wireless LAN based on the IEEE 802.11 standard. To be more specific, the scanning unit 101 stores a broadcast address in the destination address field of the probe request frame and transmits the probe request frame.

The MAC address obtaining unit 102 receives a probe response frame in the IEEE 802.11 standard to obtain the MAC address of the printer 2 from the probe response frame, which is transmitted in response to the scanning of the scanning unit 101. To be more specific, the MAC address obtaining unit 102 reads the MAC address stored in the source address field of the probe response frame.

The authentication/association performing unit 103 performs authentication and association with the printer 11 using the address obtained in the MAC address obtaining unit 102. To be more specific, the authentication/association performing unit 103 exchanges an authentication frame with the printer 11, transmits an association request frame to the printer 11, and receives an association response frame from the printer 11.

The MAC frame generating unit 104 generates a MAC frame having a format satisfying the corresponding standard of the MAC layer. To be more specific, the MAC frame generating unit 104 completes frames, and data transmitted from upper layers as MAC frames according to the corresponding standard of the MAC layer in order to transmit the frames and data in the scanning unit 101, the MAC address obtaining unit 102, and the authentication/association performing unit 103. The MAC frames generated in the MAC frame generating unit 104 are transmitted to the MAC layer of the printer 11. The MAC frame generating unit 104 of the present exemplary embodiment generates a frame that includes a session payload generated by the session payload generating unit 105, and is transmitted based on a MAC address obtained by the MAC address obtaining unit 102.

The session payload generating unit 105 generates a session payload having a format satisfying the corresponding standard of the session layer. To be more specific, the session payload generating unit 105 completes data transmitted from upper layers as session payloads according to the corresponding standard of the session layer. The session payloads generated by the session payload generating unit 105 are transmitted to the MAC frame generating unit 104 of the MAC layer. The session payload generating unit 105 of the present exemplary embodiment generates a session payload that includes data generated by the print job requesting unit 106, and is recognized by a session allotted for a print job.

The print job requesting unit 106 generates data regarding a print job and requests the print job by taking the MAC address obtained in the MAC address obtaining unit 102 as a destination. To be more specific, the print job requesting unit 106 generates data contained in a session payload to request a print job.

The printer 11 comprises a scan recognizing unit 111, a MAC address providing unit 112, an authentication/association performing unit 113, a session payload extracting unit 114, a data extracting unit 115, and a print job processing unit 116. The scan recognizing unit 111, the MAC address providing unit 112, the authentication/association performing unit 113, and the session payload extracting unit 114 belong to the MAC layer, the data extracting unit 115 belongs to a session layer, and the print job processing unit 116 belongs to the application layer.

The scan recognizing unit 111 receives a probe request frame in the IEEE 802.11 standard to recognize a station scanning for the printer that functions as an access point in a wireless LAN based on the IEEE 802.11. To be more specific, the scan recognizing unit 111 receives the probe request frame in which a broadcast address is stored in a destination address field.

The MAC address providing unit 112 transmits a probe response frame in the IEEE 802.11 standard to provide the station 10 recognized by the scan recognizing unit 111 with the MAC address of the printer 11. To be more specific, the MAC address providing unit 112 stores the MAC address of the printer 11 in the source address field of the probe response frame and transmits the frame response frame.

The authentication/association performing unit 113 performs authentication and association with the station 10 using the MAC address provided in the MAC address providing unit 112. To be more specific, the authentication/association performing unit 113 exchanges an authentication frame with the station 10, receives an association request frame from the station 10, and transmits an association response frame to the station 10.

When the authentication/association performing unit 113 completes authentication and association, the session payload extracting unit 114 extracts a session payload from a MAC frame transmitted based on the MAC address provided by the MAC address providing unit 112. To be more specific, the session payload extracting unit 114 extracts a session payload from a MAC frame based on the station recognized by the scan recognizing unit 111, the MAC address providing unit 112, and the authentication/association performing unit 113.

The data extracting unit 115 extracts data regarding a print job from the session payload recognized by a session allotted for the print job. To be more specific, the data extracting unit 115 extracts data regarding the print job from the session payload extracted by the session payload extracting unit 114.

The print job processing unit 116 processes a requested print job by taking the MAC address provided in the MAC address providing unit 112 as a destination. To be more specific, the print job processing unit 116 processes a print job regarding data extracted by the data extracting unit 115.

In comparison with the first wireless printing system shown in FIG. 6 and the second wireless printing system shown in FIG. 10, the second wireless printing system includes a session layer instead of an IP layer and TCP layer of the first wireless printing system. Therefore, the first wireless printing system uses a MAC address and IP address for communication, whereas the second wireless printing system uses only a MAC address for communication. As a result, the printer 11 of the second wireless printing system is not able to communicate with terminals that exist in a WAN based on the IP routing algorithm, whereas the printer 11 is able to process a print job request of stations in a wireless LAN area. Since those of average skill in the art can compose a technology related to the session layer in software, they can effectively realize a printer supporting wireless printing in a wireless LAN area. The second wireless printing system is worth as a printer having infinite resources and not using complicated software.

Figure 11:
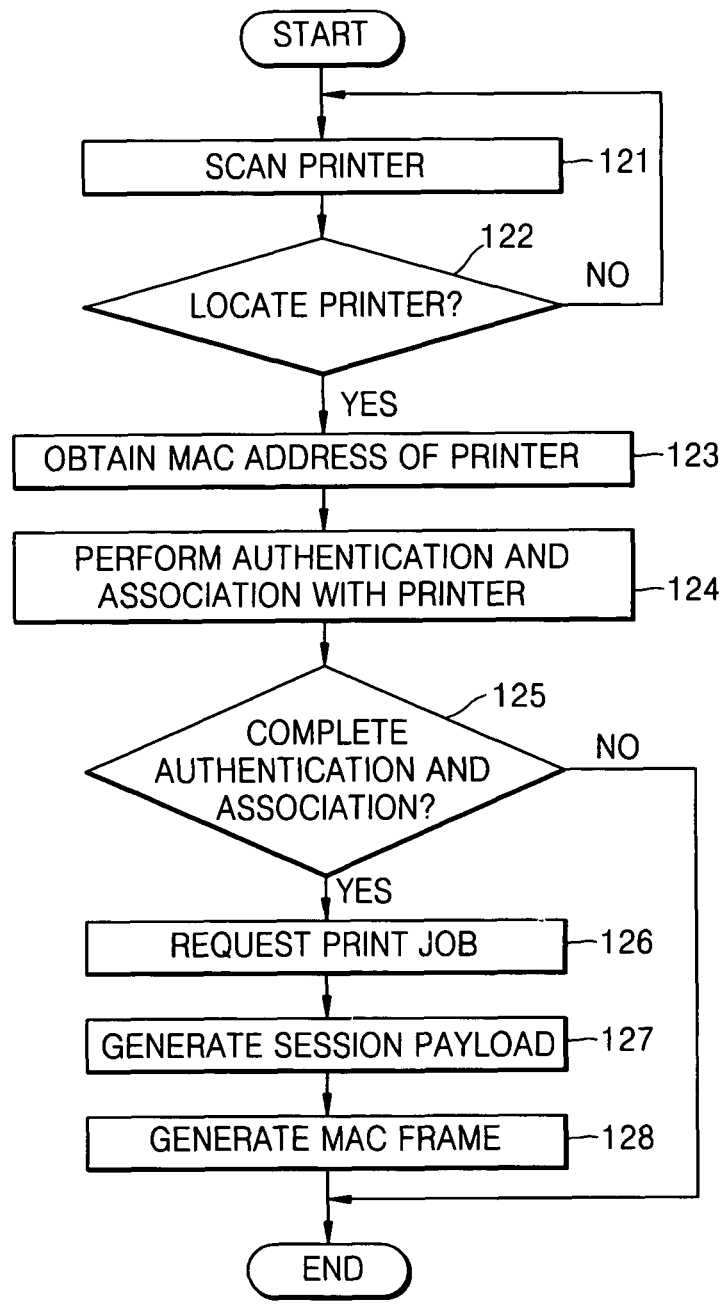
FIG. 11 is a flowchart describing a method of requesting a second print job according to an exemplary embodiment of the present invention.

FIG. 11 is a flowchart describing a method of requesting a second print job according to an exemplary embodiment of the present invention. Referring to FIG. 11, the method of requesting a second print job comprises the operations below. The method of requesting a second print job comprises time series operations processed in the station 10 shown in FIG. 10. The content described regarding the station 10 shown in FIG. 10 is also applied to a method of processing a second print job.

The station 10 broadcasts a probe request frame in the IEEE 802.11 standard to scan for a printer that functions as an access point in a wireless LAN based on the IEEE 802.11 standard (Operation 121).

The station 10 determines if the printer 11 exists based on the result obtained in Operation 121 (Operation 122).

If the station 10 determines the printer 11 exists in Operation 122, the station 10 receives a probe response frame in the IEEE 802.11 standard to obtain a MAC address of the printer 11 from the result obtained in Operation 121 (Operation 123).

The station 10 performs authentication and association with the printer 11 using the address obtained in Operation 123 (Operation 124).

The station 10 determines if authentication and association are completed based on the result obtained in Operation 124 (Operation 125).

If the station 10 determines it has completed authentication and association in Operation 124, the station 10 generates data regarding a print job to request the print job by taking the MAC address obtained in Operation 123 as a destination (Operation 126). To be more specific, the station 10 generates data contained in a session payload to request the print job (Operation 126).

The station 10 generates a session payload having a format satisfying the corresponding standard of the session layer (Operation 127). The station 10 of the present exemplary embodiment generates a session payload that includes data generated in Operation 126, and is recognized by a session allotted for a print job.

The station 10 generates a MAC frame having a format satisfying the corresponding standard of the MAC layer (Operation 128). The station 10 of the present exemplary embodiment generates a frame that includes a session payload generated in Operation 127, and is transmitted based on the MAC address obtained in Operation 123.

Figure 12:
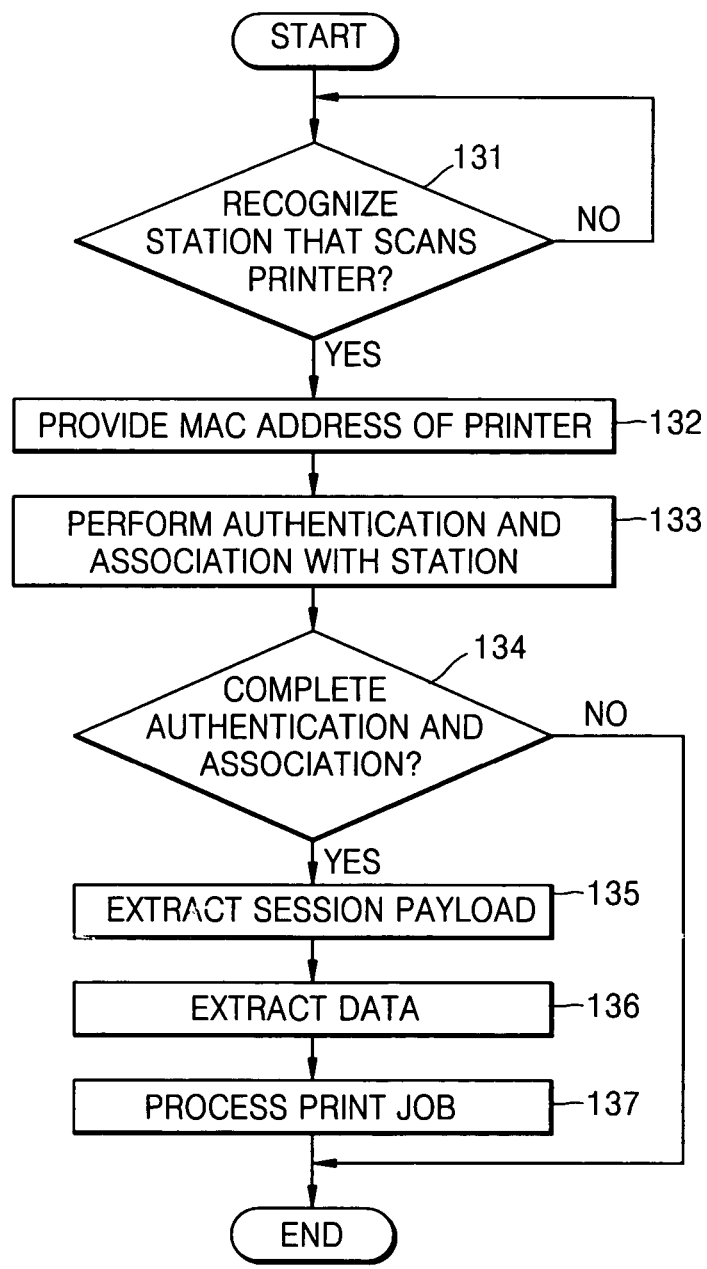
FIG. 12 is a flowchart describing a method of processing a second print job according to an exemplary embodiment of the present invention.

FIG. 12 is a flowchart describing a method of processing a second print job according to an exemplary embodiment of the present invention. Referring to FIG. 12, the method of processing a second print job comprises the operations below. The method of processing a second print job comprises time series operations processed in the printer 11 shown in FIG. 10. The content described regarding the printer 11 shown in FIG. 10 is also applied to a method of processing a second print job.

The printer 11 receives a probe request frame in the IEEE 802.11 standard and recognizes the station 10 that scans a printer that functions as an access point in a wireless LAN based on the IEEE 802.11 standard (Operation 131).

If the printer 11 recognizes the station 10 in Operation 131, the printer 11 transmits a probe response frame in the IEEE 802.11 standard to provide the station 10 recognized by the scan recognizing unit 111 with the MAC address of the printer 11 (Operation 132).

The printer 11 performs authentication and association with the station 10 using the MAC address provided in Operation 132 (Operation 133).

The printer 11 determines if authentication and association are completed based on the result obtained in Operation 133 (Operation 134).

If the printer 11 determines it has completed authentication and association in Operation 134, the printer 11 extracts a session payload from the MAC frame transmitted based on the MAC address provided in Operation 132 (Operation 135).

The printer 11 extracts data regarding a print job from the session payload recognized by a session allotted for the print job (Operation 136). To be more specific, the printer 11 extracts data regarding the print job from the session payload extracted in Operation 135 (Operation 136).

The printer 11 processes a requested print job by taking the MAC address provided in Operation 132 as a destination (Operation 137). To be more specific, the printer 11 processes a print job regarding data extracted in Operation 136 (Operation 137).

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

As described above, it is possible to locate a printer that functions as an AP while stations associate with a BSS in a wireless LAN based on IEEE 802.11 standard, thereby providing wireless printing services using small-sized and simple software. This has resulted in settling the problems of the conventional art that involves a complicated process that a network manager should inform user of an IP address, fails to obtain an IP address when a network manager is absent, separately performs a SDP process, and has terminals manufactured by different printer companies which are not compatible with each other.

Since a technology related to the session layer can be composed in simpler software, a printer that supports wireless printing in the wireless LAN area can be effectively realized. That is, it is worth as a printer having infinite resources and not using complicated software.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of requesting a print job at a station, the method comprising:
   scanning for a printer that functions as an Access Point (AP) in a wireless Local Area Network (LAN) by broadcasting a probe request frame according to an IEEE 802.11 standard;
   automatically obtaining: in response to the broadcasting, an address of the printer, by receiving a probe response frame in the IEEE 802.11 standard, the address being a Media Access Control (MAC) address of the printer;
   transmitting an association request frame generated using the MAC address of the printer to the printer;
   receiving from the printer, an association response frame in response to the association request frame;
   generating a print job request by utilizing the address of the printer obtained by the scanning as a destination of the print job; and
   transmitting the print job request to the printer obtained by the scanning,
   wherein the print job is requested by utilizing the MAC address of the printer included in the probe response frame, as the destination of the print job.

2. The method of claim 1, wherein the address is a physical address of a network card installed in the printer.

3. The method of claim 1, further comprising:
   generating a payload recognized by a session allotted for the print job; and
   wherein the print job is requested by generating data to be contained in the payload.

4. The method of claim 1, further comprising:
   generating a payload recognized by a Transmission Control Protocol (TCP) port allotted for the print job,
   wherein the print job is requested by generating data to be contained in the payload.

5. The method of claim 4, further comprising:
   obtaining an Internet Protocol (IP) address corresponding to the address; and
   generating a packet including the payload, wherein the packet is transmitted based on the IP address.

6. The method of claim 5, wherein the obtaining the IP address is performed by obtaining an IP address corresponding to the address according to a Reverse Address Resolution Protocol (RARP).

7. The method of claim 1, further comprising:
   performing authentication with the printer using the address of the printer obtained by the scanning,
   wherein the generating the print job request is performed when the authentication are completed.

8. The method of claim 1, wherein the station obtains the address of the printer from a source address field of the probe response frame.

9. A station comprising:
   a scanning unit which scans for a printer that functions as an Access Point (AP) in a wireless Local Area Network (LAN) by broadcasting a probe request frame according to an IEEE 802.11 standard;
   an address obtaining unit which automatically obtains an address of the printer scanned for by the scanning unit by receiving a probe response frame in the IEEE 802.11 standard, the address being a Media Access Control (MAC) address of the printer;
   an association performing unit which transmits an association request frame generated using the MAC address of the printer to the printer and receives an association response frame from the printer in response to the association request frame; and
   a print job generating unit which generates a print job request by utilizing the address of the printer obtained in the address obtaining unit as a destination of the print job and transmits the print job request to the printer,
   wherein the print job is requested by utilizing the MAC address of the printer included in the probe response frame, as the destination of the print job.

10. The station of claim 9, wherein the address is a physical address of a network card installed in the printer.

11. A method of processing a print job at a printer, the method comprising:
   recognizing a station that scans for a printer that functions as an Access Point (AP) in a wireless Local Area Network (LAN) by receiving a probe request frame according to an IEEE 802.11 standard;
   automatically providing the station with an address of the printer by sending a probe response frame in the IEEE 802.11 standard to the station, the address being a Media Access Control (MAC) address of the printer;
   receiving an association request frame generated using the MAC address of the printer from the station;
   transmitting an association response frame in response to the association request frame to the station; and
   processing a requested print job by utilizing the address as a destination of the requested print job,
   wherein the print job is requested by utilizing the MAC address of the printer included in the probe response frame, as the destination of the print job.

12. The method of claim 11, wherein the address is a physical address of a network card installed in the printer.

13. The method of claim 11, further comprising:
   extracting data regarding the requested print job from a payload recognized by a session allotted for the requested print job,
   wherein the processing the requested print job is performed by processing the data which is extracted.

14. The method of claim 11, further comprising:
   extracting data regarding the requested print job from a payload recognized by a Transmission Control Protocol (TCP) allotted for the requested print job,
   wherein the processing the requested print job is performed by processing the data which is extracted.

15. The method of claim 14, further comprising:
providing an Internet Protocol (IP) address corresponding to the address; and
extracting the payload from a packet transmitted based on the IP address.

16. A printer comprising:
a scan recognizing unit which recognizes a station that scans for a printer that functions as an Access Point (AP) in a wireless Local Area Network (LAN) by receiving a probe request frame according to an IEEE 802.11 standard;
an address providing unit which automatically provides the station recognized by the scan recognizing unit with an address of the printer in the IEEE 802.11 standard, the address being a Media Access Control (MAC) address of the printer; and
an association performing unit which receives an association request frame generated using the MAC address of the printer from the station and transmits an association response frame in response to the association request frame to the station;
a print job processing unit processing a requested print job by utilizing the address provided in the address providing unit as a destination of the requested print job,
wherein the print job is requested by utilizing the MAC address of the printer included in the probe response frame, as the destination of the print job.

17. The printer of claim 16, wherein the address is a physical address of a network card installed in the printer.

18. A non-transitory computer readable medium having recorded thereon a computer readable program for a method of requesting a print job at a station, wherein the method comprises:
scanning for a printer that functions as an Access Point (AP) in a wireless Local Area Network (LAN) by broadcasting a probe request frame according to an IEEE 802.11 standard;
automatically obtaining, in response to the broadcasting, an address of the printer by receiving a probe response frame in the IEEE 802.11 standard, the address being a Media Access Control (MAC) address of the printer;
transmitting an association request frame generated using the MAC address of the printer to the printer;
receiving from the printer, an association response frame in response to the association request frame;
generating a print job request by utilizing the address of the printer obtained by the scanning as a destination of the print job; and
transmitting the print job request to the printer obtained by the scanning,
wherein the print job is requested by utilizing the MAC address of the printer included in the probe response frame, as the destination of the print job.

19. A non-transitory computer readable medium having recorded thereon a computer readable program for a method of processing a print job at a printer, wherein the method comprises:
recognizing a station that scans for a printer that functions as an Access Point (AP) in a wireless Local Area Network (LAN) by receiving a probe request frame according to an IEEE 802.11 standard;
automatically providing the station which is recognized with an address of the printer by sending a probe response frame in the IEEE 802.11 standard to the station, the address being a Media Access Control (MAC) address of the printer;
receiving an association request frame generated using the MAC address of the printer from the station;
transmitting an association response frame in response to the association request frame to the station; and
processing a requested print job by utilizing the address as a destination of the requested print job,
wherein the print job is requested by utilizing the MAC address of the printer included in the probe response frame, as the destination of the print job.

* * * * *